United States Patent [19]
Takei

[11] Patent Number: 6,051,931
[45] Date of Patent: Apr. 18, 2000

[54] WORK LAMP ON-OFF CONTROL CIRCUIT

[75] Inventor: Yoshitaka Takei, Kitatsuru-gun, Japan

[73] Assignee: Hino Jidosha Kogyo Kabushiki Kaisha, Tokyo, Japan

[21] Appl. No.: 09/157,570

[22] Filed: Sep. 21, 1998

[30] Foreign Application Priority Data

Apr. 15, 1998  [JP]  Japan .................................. 10-104810

[51] Int. Cl.⁷ .................................................. B60Q 1/26
[52] U.S. Cl. .............................. 315/79; 315/77; 315/84; 307/10.1; 307/10.8
[58] Field of Search ............................... 315/84, 77, 360, 315/362, 79, 82, 83; 307/10.1, 10.7, 10.8, 141, 141.4

[56] References Cited

U.S. PATENT DOCUMENTS

| | | | |
|---|---|---|---|
| 4,739,224 | 4/1988 | Geerlings | 315/84 |
| 4,786,843 | 11/1988 | Yamamoto et al. | 315/77 |
| 4,866,345 | 9/1989 | Kataoka | 315/84 |
| 4,891,559 | 1/1990 | Matsumoto et al. | 315/82 |
| 5,220,245 | 6/1993 | Honda et al. | 315/79 |
| 5,321,305 | 6/1994 | Kolomyski | 307/10.8 |
| 5,588,733 | 12/1996 | Gotoru | 315/82 |
| 5,831,389 | 11/1998 | Kawashima et al. | 315/77 |
| 5,907,196 | 5/1999 | Hayami et al. | 315/79 |

FOREIGN PATENT DOCUMENTS

10-129341  5/1998  Japan .

Primary Examiner—Haissa Philogene
Assistant Examiner—Thuy Vinh Tran
Attorney, Agent, or Firm—Pillsbury Madison & Sutro LLP

[57] ABSTRACT

If an ignition switch of a vehicle is ON and the vehicle speed is not zero (i.e., the vehicle is travelling), the lighting of a work lamp is prohibited even if the work lamp operating switch has been set to ON. This ensures that a work lamp does not remain lit by mistake while the vehicle is travelling, and that battery consumption by unnecessary lighting of a work lamp is minimized.

14 Claims, 9 Drawing Sheets

WORK LAMP ON-OFF CONTROL CIRCUIT

BACKGROUND OF THE INVENTION

This application claims the benefit of foreign priority under 35 U.S.C. § 119 of Japanese Application No. 10-104810 filed on Apr. 15, 1998, the contents of which are incorporated herein by reference.

1. Field of the Invention

This invention relates to an on-off control circuit of a work lamp mounted on a motor vehicle in which the work lamp serves to illuminate the cargo bed, etc. of the vehicle. More particularly, it relates to an improvement of the circuit for controlling a work lamp mounted on a vehicle, the work lamp comprising a white lamp for illuminating the rear of the vehicle.

2. Description of Related Art

Work lamps for illuminating the cargo bed, etc. of a truck so that work such as loading and unloading of goods can be carried out at night are known. A work lamp of this sort is switched on and off by the driver or other operator. However, if the driver forgets to turn off the work lamp after the work is finished and drives off in the vehicle with the lamp still lit, the drivers may incur problems. For example, traffic regulations in many countries stipulate that a vehicle shall not be driven while a work lamp is lit. Furthermore, because work lamps usually take electric current from the battery carried by the vehicle, having a work lamp unnecessarily and wastefully lit drains the battery.

The present applicant has previously filed Japanese Patent Application No. 8-283653 (hereinafter referred to as the '653 application), which relates to a work lamp on-off control circuit directed to obviating the shortcomings of the prior art. The '653 application disclosed a circuit for ensuring that a work lamp does not remain carelessly lit while the vehicle is travelling and only lights up when the parking brake is operative. According to this circuit, once the parking brake has been released, an action which would otherwise turn the work lamp on is overridden and the work lamp is actively turned off.

Motor vehicles fitted with an implementation of the invention disclosed in the '653 application have been sold. However, drivers operating vehicles in places where the land is extremely flat, such as in North America, have the habit of not always operating the parking brake when they stop their vehicle. There is therefore a need for an improvement of the conditions under which a work lamp can be turned on.

SUMMARY OF THE INVENTION

The present invention has been devised to achieve the improvements needed and requested by vehicle users and drivers. Namely, it is an object of the present invention to provide an on-off control circuit which separates the on-off control of a work lamp from the operation of the parking brake, but which ensures that a work lamp does not remain inadvertently lit while driving. It is a further object of the present invention to provide a work lamp on-off control circuit which keeps battery consumption to a minimum. It is yet another object of the present invention to provide a work lamp on off control circuit which automatically turns a work lamp on or off at night in accordance with the opening or shutting of the vehicle door on the driver's side (i.e., driver's door), even if the switch for turning on the work lamp is not operated. This feature is useful if work taking only a short time is to be carried out.

The present invention ensures that a work lamp does not remain carelessly lit when a vehicle is being driven, and enables it to light up when a vehicle is stationary, even if the parking brake has not been operated.

Namely, a first feature of the present invention comprises a work lamp on-off control circuit for controlling the on-off switching of a work lamp in accordance with the state of an operating switch. The work lamp comprises a white lamp for illuminating the rear of a vehicle. The work lamp on-off control circuit includes a means which, when the ignition switch is ON and the vehicle speed is not zero, prohibits the lighting of the work lamp, even if the operating switch has been set to ON.

This invention preferably comprises: means which, when the ignition switch is ON and the vehicle speed is zero, turns on the work lamp for the period from when the driver's door is opened until it is shut, even if the operating switch is set to OFF; means which, if the ignition switch is OFF and the driver's door has been opened, causes the work lamp to light, and which causes the work lamp to turn off when a fixed time interval has elapsed after the shutting of the door; and means which, if the ignition switch is OFF, causes the work lamp to light for the period from when the driver's door is opened until it is shut, provided that the fixed period of time has not been exceeded.

When the ignition switch is turned ON, the engine has started, and the vehicle speed is not zero (i.e., when the vehicle is being driven), lighting of the work lamp is prohibited even if the operating switch for turning on the work lamp has been set to ON. This makes it possible to avoid the situation in which a work lamp bothers drivers in following vehicles due to the work lamp being carelessly left on during the ordinary driving of the vehicle.

Irrespective of whether or not the parking brake has been operated, the work lamp can also light when the ignition switch has been turned ON and the engine has started but the vehicle speed is zero (i.e., when the vehicle is stationary with its engine running). Under these circumstances, even if the work lamp operating switch is not operated, the work lamp lights when the driver's door is opened, and is turned off when the driver's door is shut. Control of this sort obviates the need to operate an operating switch for turning the work lamp on and off each time the vehicle temporarily stops with its engine left running and goods are loaded or unloaded, or some other work is performed.

Irrespective of whether or not the parking brake has been operated, the work lamp lights when the ignition switch has been turned OFF and the driver's door or another door has been opened. In this case the work lamp is turned off when a predetermined fixed time interval has elapsed after the shutting of the door. As a result, despite the vehicle remaining stationary, it is possible to avoid the situation in which a work lamp remains lit for a long period of time because the driver or other operator has forgotten to turn off the work lamp after the engine has been stopped and work has been carried out.

If a door is opened when the ignition switch has been turned off and the engine has been stopped, a timer is set, and provided that a fixed time is not exceeded, the work lamp remains lit until the door is shut. If the work is finished within the set time and the door is shut, the work lamp is turned off. Even if the driver or other operator forgets to turn off the work lamp when the work has been finished and the door is left open, the work lamp is turned off automatically after the fixed time has elapsed, thereby avoiding battery consumption by unnecessary illumination.

A second- feature of this invention includes a work lamp on-off control circuit for controlling the on-off switching of a work lamp in accordance with the state of an operating switch, in which the work lamp comprises a white lamp for illuminating the rear of a vehicle. The on-off control circuit comprises a means which, when an engine rotation sensor indicates that the engine is rotating, a vehicle speed sensor indicates that the vehicle speed is zero, and a lighting switch is in the OFF state, prohibits the lighting of the work lamp even if the operating switch is set to ON.

The lighting switch serves to turn on and off the illumination and indicator lamps used at night, these lamps including headlamps, tail lamps and side-marker lamps. When this lighting switch is in the OFF state, and the output of the engine rotation sensor indicates that the engine is rotating, and the output of the vehicle speed sensor indicates that the vehicle speed is zero, lighting of the work lamp is prohibited even if its operating switch is set to ON. Consequently, provided that the lighting switch is not set to ON, the work lamp will not light even if its operating switch is set to ON.

Because the present invention turns a work lamp on or off according to whether or not the vehicle is stationary, quite separately from the operation of the parking brake, it reliably prevents the situation in which a work lamp is mistakenly lit while the vehicle is travelling. Moreover, when there is a short period of work at night, even if the operating switch for turning on the work lamp has not been set to ON, the work lamp is turned on automatically when the driver's door opens. Furthermore, even if the driver forgets to turn off the work lamp, because it tuns off automatically after a fixed period of time, battery consumption due to unnecessary lighting of the work lamp is minimized.

BRIEF DESCRIPTION OF THE DRAWINGS

Embodiments of this invention will now be described with reference to the drawings.

DETAILED DESCRIPTION OF THE PREFERRED EMBODIMENTS

Figure 1:
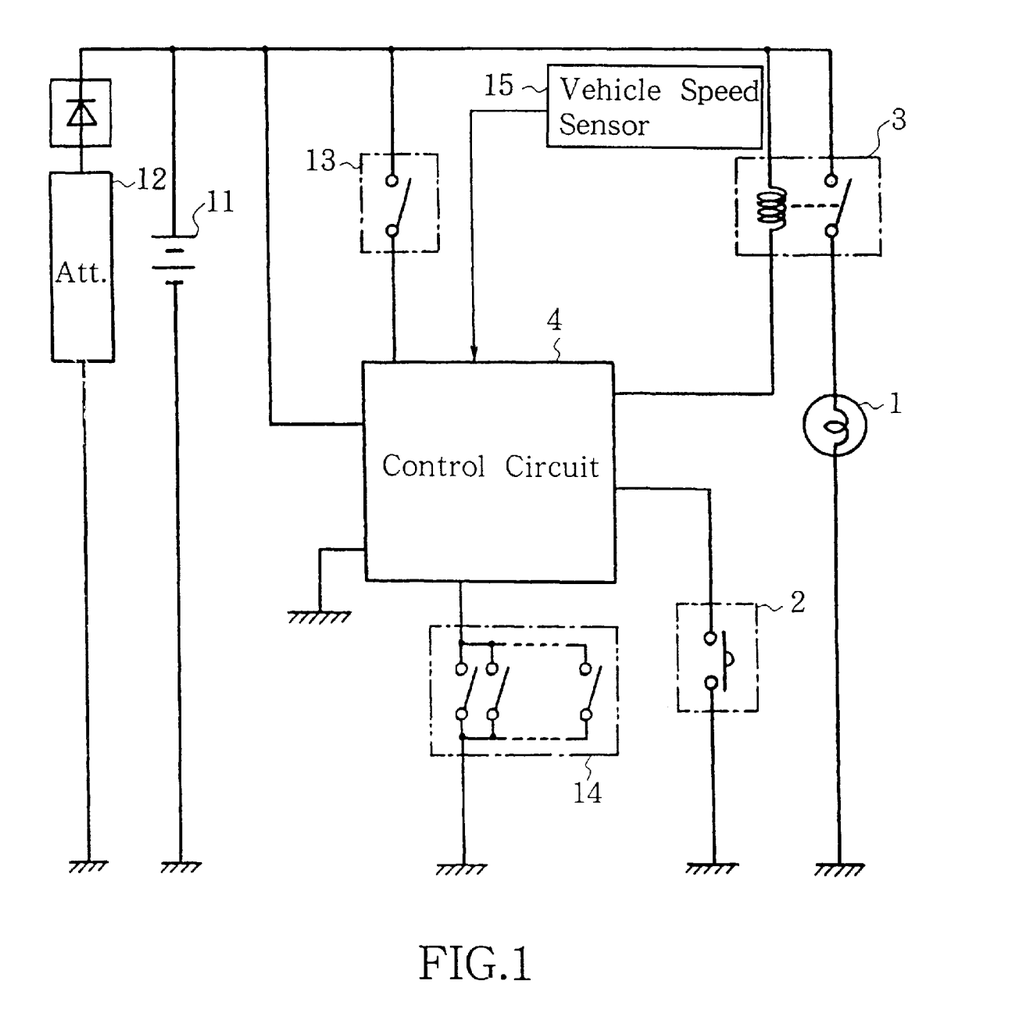
FIG. 1 is a block diagram showing the configuration of the main parts of a first embodiment of the present invention.

FIG. 1 is a block diagram showing the configuration of the main parts of a first embodiment of the present invention.

This first embodiment comprises work lamp 1; operating switch 2 for turning work lamp 1 on by being set to ON, and for turning work lamp 1 off by being set to OFF; relay circuit 3 for making or breaking the connection between work lamp 1 and a power source comprising battery 11 and alternator 12 in accordance with the operation of the operating switch 2; ignition switch 13; and control circuit 4 for on-off control of work lamp 1. The control circuit 4 receives the output of door switch 14 and vehicle speed sensor 15. Door switch 14 is set to the ON state when a door is opened. A momentary switch is utilized for operating switch 2.

Control circuit 4 comprises means to which is input the output signal of operating switch 2 and which serves to make or break relay circuit 3. Control circuit 4 also comprises means which, when ignition switch 13 is ON and the output of vehicle speed sensor 15 is not zero, prohibits the lighting of work lamp 1 even if operating switch 2 has been operated. Control circuit 4 further comprises means which, when ignition switch 13 is ON and the output of vehicle speed sensor 15 is zero, turns work lamp 1 on for the period from when the driver's door or another door has been opened until it is shut. Control circuit 4 also comprises means which causes work lamp 1 to light when ignition switch 13 is OFF and the driver's door or another door has been opened, and which turns work lamp 1 off after a fixed period of time from when the door was shut.

Figure 2:
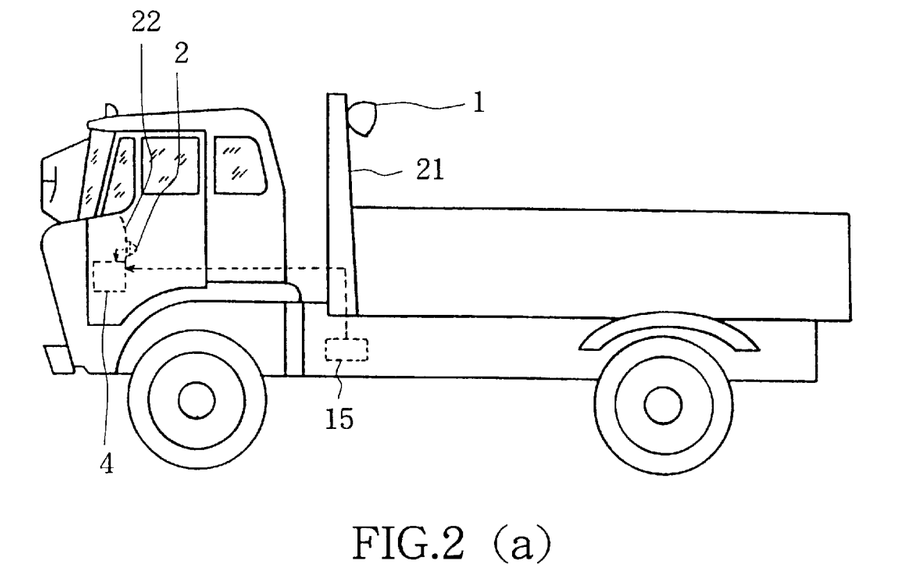
FIG. 2(a) is a side view showing an example of a first embodiment of this invention mounted on a vehicle with a guard frame.
FIG. 2(b) is a side view showing an example of mounting on a vehicle with no guard frame.

FIG. 2(a) is a side view showing an example of a first embodiment of this invention mounted on a vehicle with a guard frame, while FIG. 2(b) is a side view showing an example of mounting on a vehicle with no guard frame. Work lamp 1 may be mounted on guard frame 21 if provided. Operating switch 2 is provided on instrumental panel 22.

Figure 3:
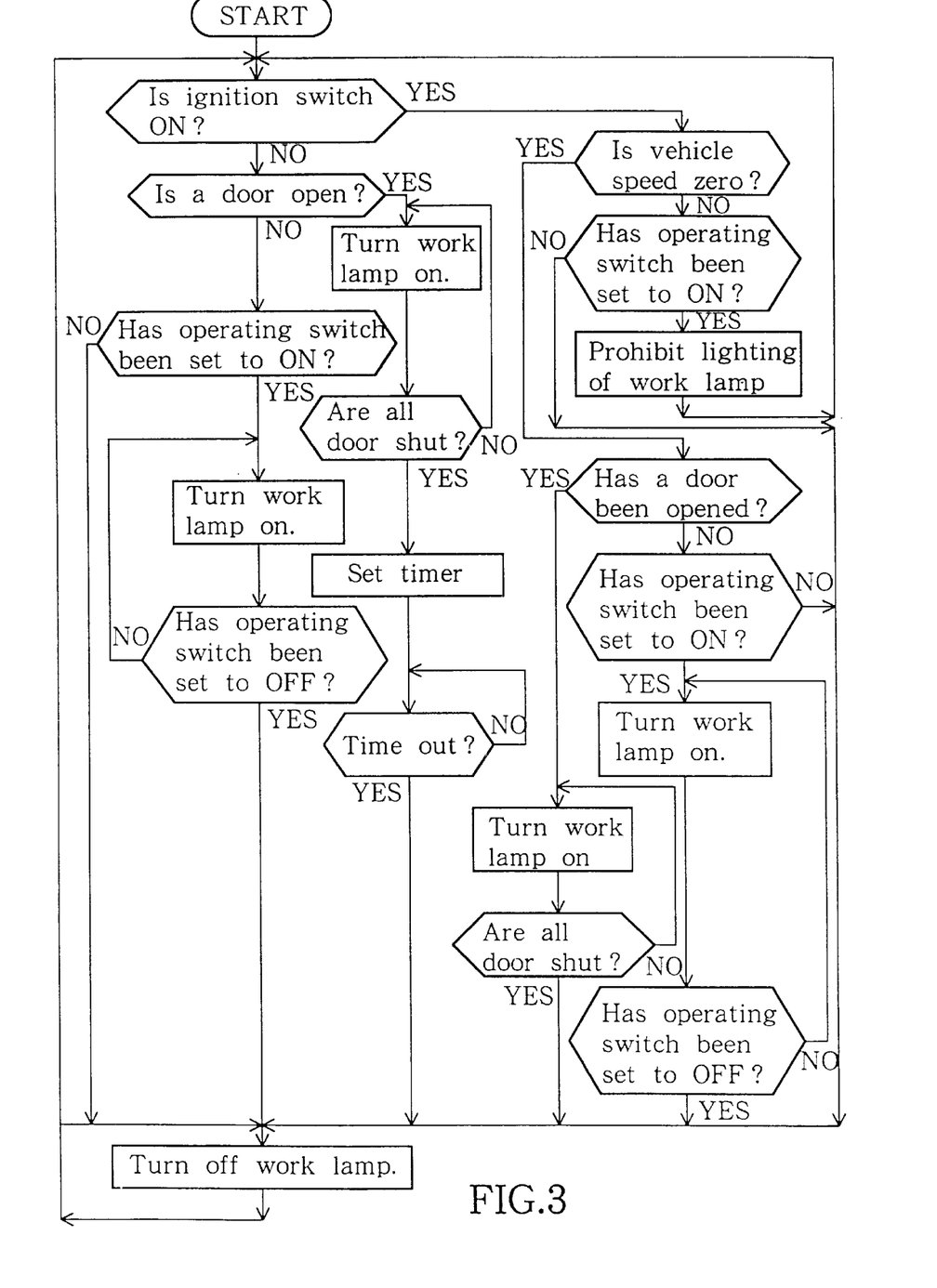
FIG. 3 is a flowchart showing the operating flow of a first embodiment of this invention.

The operation of the first embodiment of this invention will now be explained. FIG. 3 is a flowchart showing the operational flow of the first embodiment.

When ignition switch 13 is OFF and door switch 14 is OFF (namely, all doors are shut), control circuit 4 turns on work lamp 1 if operating switch 2 is set to ON. In this state, work lamp 1 is turned off when operating switch 2 is set to OFF.

Work lamp 1 is also turned on when ignition switch 13 is OFF, a door has been opened, and door switch 14 is ON. When all the doors have been shut and door switch 14 is OFF, a timer is set. When a fixed time (for example, 60 seconds) has elapsed, work lamp 1, which had been lit, is turned off. By thus having work lamp 1 turn off when a fixed period of time has elapsed since the doors were shut, then despite the vehicle remaining stationary, the situation is avoided in which work lamp 1 remains lit for a long period of time because the driver has forgotten to turn off work lamp 1 after the engine has been stopped and work has been carried out.

When ignition switch 13 is ON, control circuit 4 receives the output of vehicle speed sensor 15. When the vehicle speed is not zero and operating switch 2 has been set to ON, then because the vehicle is travelling, control circuit 4 prohibits the lighting of work lamp 1. If operating switch 2 has not been set to ON, work lamp 1 remains turned off.

If ignition switch 13 is ON and the output of vehicle speed sensor 15 indicates zero speed, and door switch 14 is OFF (i.e., all the doors are shut), work lamp 1 is turned on if operating switch 2 has been set to ON. In this state, if operating switch 2 is set to OFF, work lamp 1 is turned off.

If ignition switch 13 is ON and the output of vehicle speed sensor 15 indicates zero speed, and door switch 14 is ON (i.e., a door is open), work lamp 1 is turned on until all the doors are shut and door switch 14 is OFF. Keeping work lamp 1 lit if the vehicle speed is zero (i.e., if the vehicle is stationary) and a door is open obviates the need to operate operating switch 2 to turn work lamp 1 on and off each time the vehicle temporarily stops with its engine left running and goods are loaded or unloaded, or some other work is performed.

Because turning the work lamp on and off can be performed separately from the operation of the parking brake in the manner described above, the work lamp can be turned on even if the parking brake has not been operated when the vehicle is stationary. Moreover, it is possible to avoid the situation in which the work lamp is mistakenly lit while the vehicle is travelling. At night, the work lamp is turned on or off automatically in accordance with the opening or shutting of a door. In addition, because unnecessary lighting of the work lamp is avoided, battery consumption is reduced to a minimum. A driver who has installed a work lamp according to the present invention will find its use very convenient.

Second Embodiment

Figure 4:
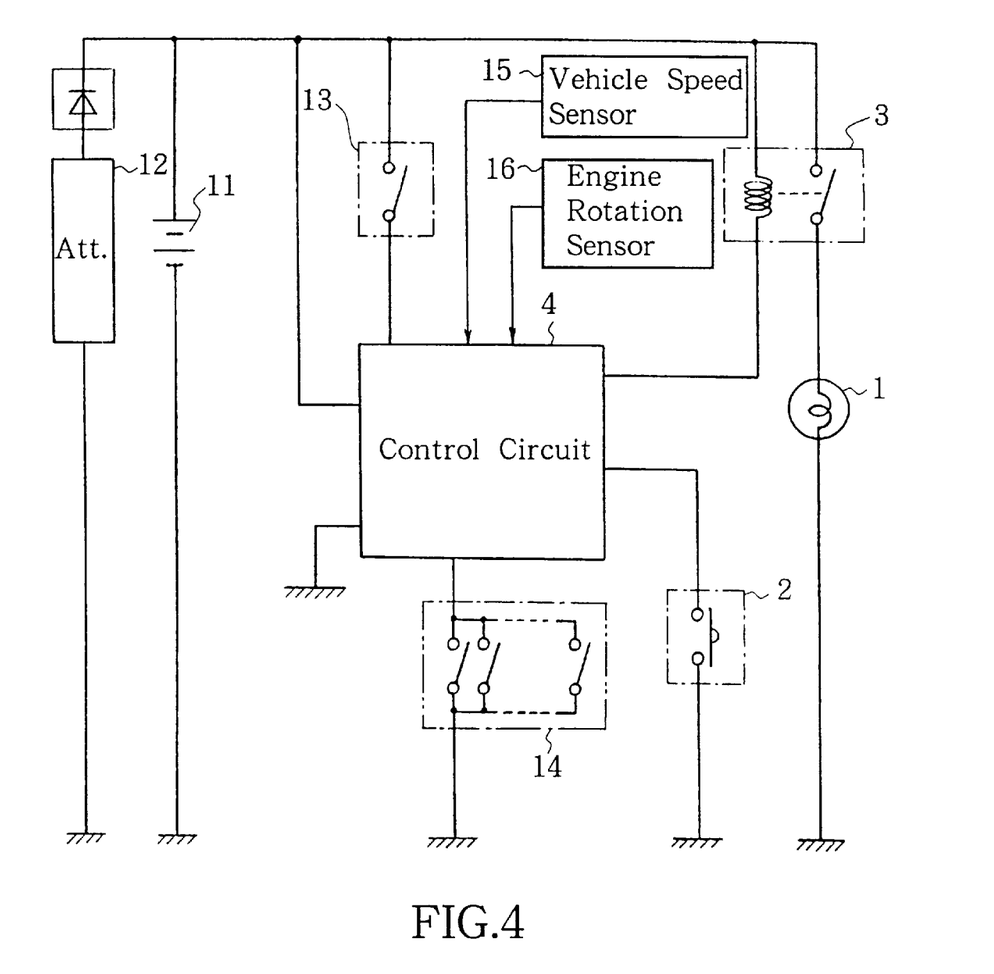
FIG. 4 is a block diagram showing the configuration of the main parts of a second embodiment of this invention.

FIG. 4 is a block diagram showing the configuration of the main parts of a second embodiment of this invention.

According to this second embodiment, control circuit 4 comprises, in addition to the configuration of the first embodiment, means for receiving the output of engine rotation sensor 16, and means which, if ignition switch 13 is OFF, causes work lamp 1 to light for the period from when the driver's door or another door is opened until it is shut, provided that a fixed time interval has not been exceeded. Otherwise, this second embodiment of the invention has the same configuration as the first embodiment.

Figure 5:
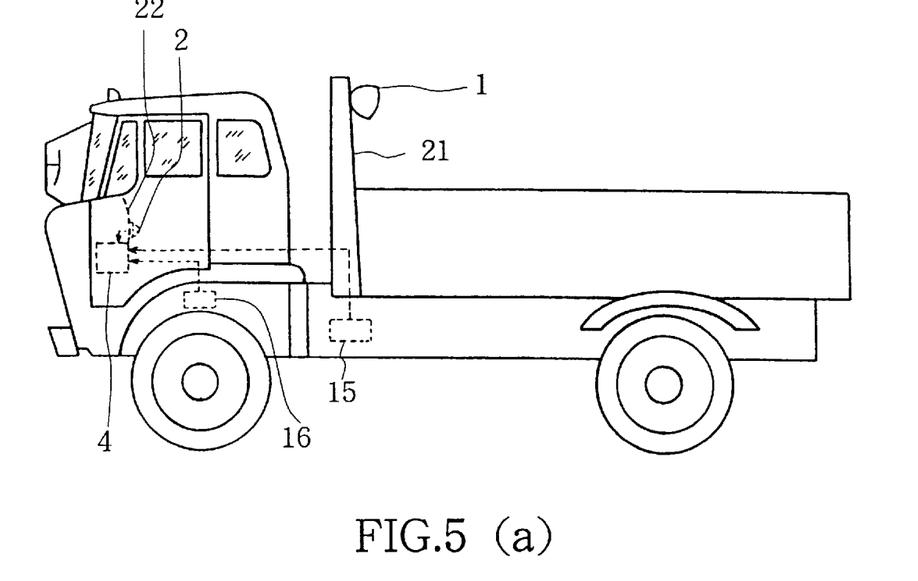
FIG. 5(a) is a side view showing an example of the second embodiment of this invention mounted on a vehicle with a guard frame.
FIG. 5(b) is a side view showing an example of it mounted on a vehicle with no guard frame.
Figure 6:
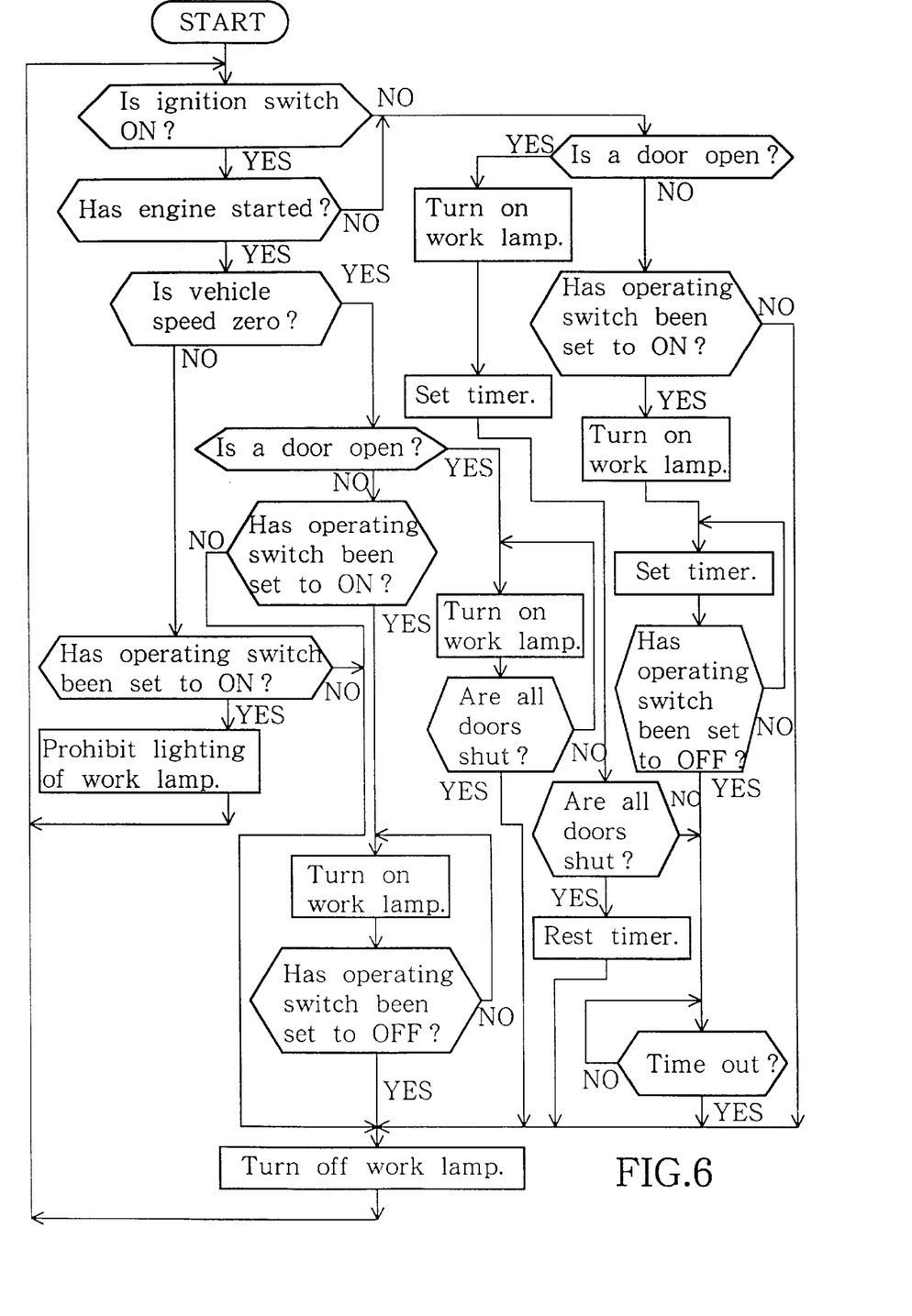
FIG. 6 is a flowchart showing the operating flow of the second embodiment of this invention.

FIG. 5(a) is a side view showing an example of this second embodiment of the invention mounted on a vehicle with a guard frame, while FIG. 5(b) is a side view showing an example of it mounted on a vehicle with no guard frame. The operation of the second embodiment of this invention will now be described. FIG. 6 is a flowchart showing the operational flow of this second embodiment.

When ignition switch 13 is ON, and the output of engine rotation sensor 16 shows that the engine has started, and the output of vehicle speed sensor 15 indicates that the vehicle speed is not zero, control circuit 4 prohibits the lighting of work lamp 1 if operating switch 2 has been set to ON, because the vehicle is being driven. If operating switch 2 has not been set to ON, work lamp 1 remains unlit.

When ignition switch 13 is ON, and the output of engine rotation sensor 16 shows that the engine has started, and the output of vehicle speed sensor 15 indicates that the vehicle speed is zero, and door switch 14 is OFF (i.e., all the doors are shut), work lamp 1 is turned on if operating switch 2 has been set to ON. In this state, if operating switch 2 is set to OFF, work lamp 1 is turned off.

If the engine has started and the output of vehicle speed sensor 15 indicates that the vehicle speed is zero, work lamp 1 is turned on if a door is open and door switch 14 is ON, but is turned off when all the doors are shut and door switch 14 is OFF.

If ignition switch 13 is OFF or the output of engine rotation sensor 16 indicates zero engine rotation, and door switch 14 is OFF (i.e., all doors are shut), and operating switch 2 has been set to ON, work lamp 1 is turned on and the timer is set. At this point in the processing, even if operating switch 2 is set to OFF, work lamp 1 remains lit until a fixed time (for example, 5 minutes) has elapsed and it is timed out. By thus ensuring that when the vehicle is stationary work lamp 1 is turned off when a fixed period of time has elapsed since the doors were shut, then if for one reason or another the cargo bed has to be re-checked, etc., work lamp 1 will still be lit, thereby obviating the need to operate operating switch 2 for this purpose.

If ignition switch 13 is OFF or the output of engine rotation sensor 16 indicates zero engine rotation, and door switch 14 is ON (i.e., a door has been opened), work lamp 1 is turned on and the timer is set. If all the doors have been shut and door switch 14 is OFF, the timer is reset and work lamp 1 is turned off. In this case, even if a door remains open for a long time after the work has been completed, work lamp 1 is automatically turned off after a fixed period of time, thereby reducing unnecessary discharge of battery 11.

Third Embodiment

Figure 7:
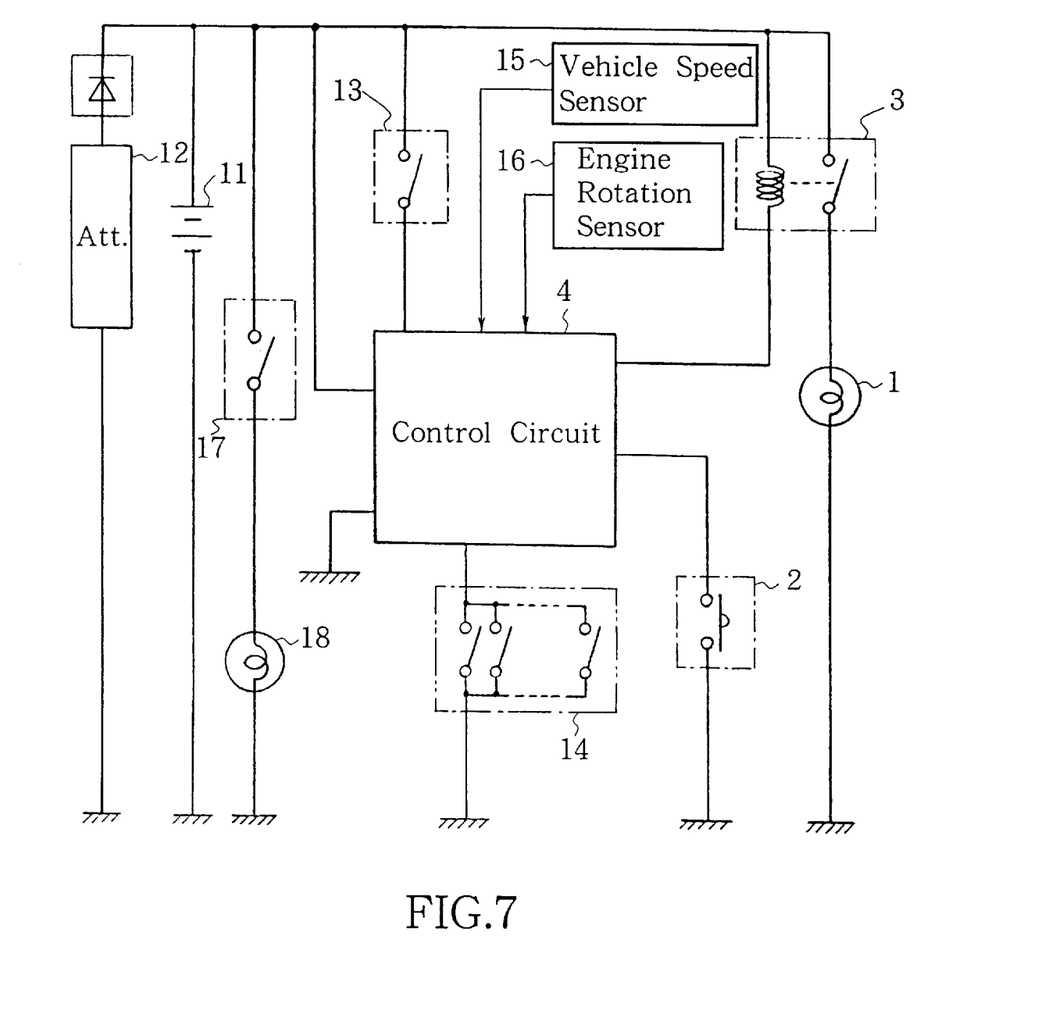
FIG. 7 is a block diagram showing the configuration of the main parts of a third embodiment of this invention.

FIG. 7 is a block diagram showing the configuration of the main parts of a third embodiment of this invention.

According to this third embodiment, control circuit 4 comprises, in addition to the configuration of the second embodiment, means for receiving the output of lighting switch 17 which is operated when night-time illumination and indicator lamps 18 are turned on, these lamps including headlamps, tail lamps and side-marker lamps; and means which, when engine rotation sensor 16 shows that the engine is rotating and vehicle speed sensor 15 shows that the vehicle speed is zero, and lighting switch 17 is OFF, prohibits the lighting of work lamp 1 even if operating switch 2 has been set to ON. Otherwise, this third embodiment has the same configuration as the second embodiment.

Figure 8:
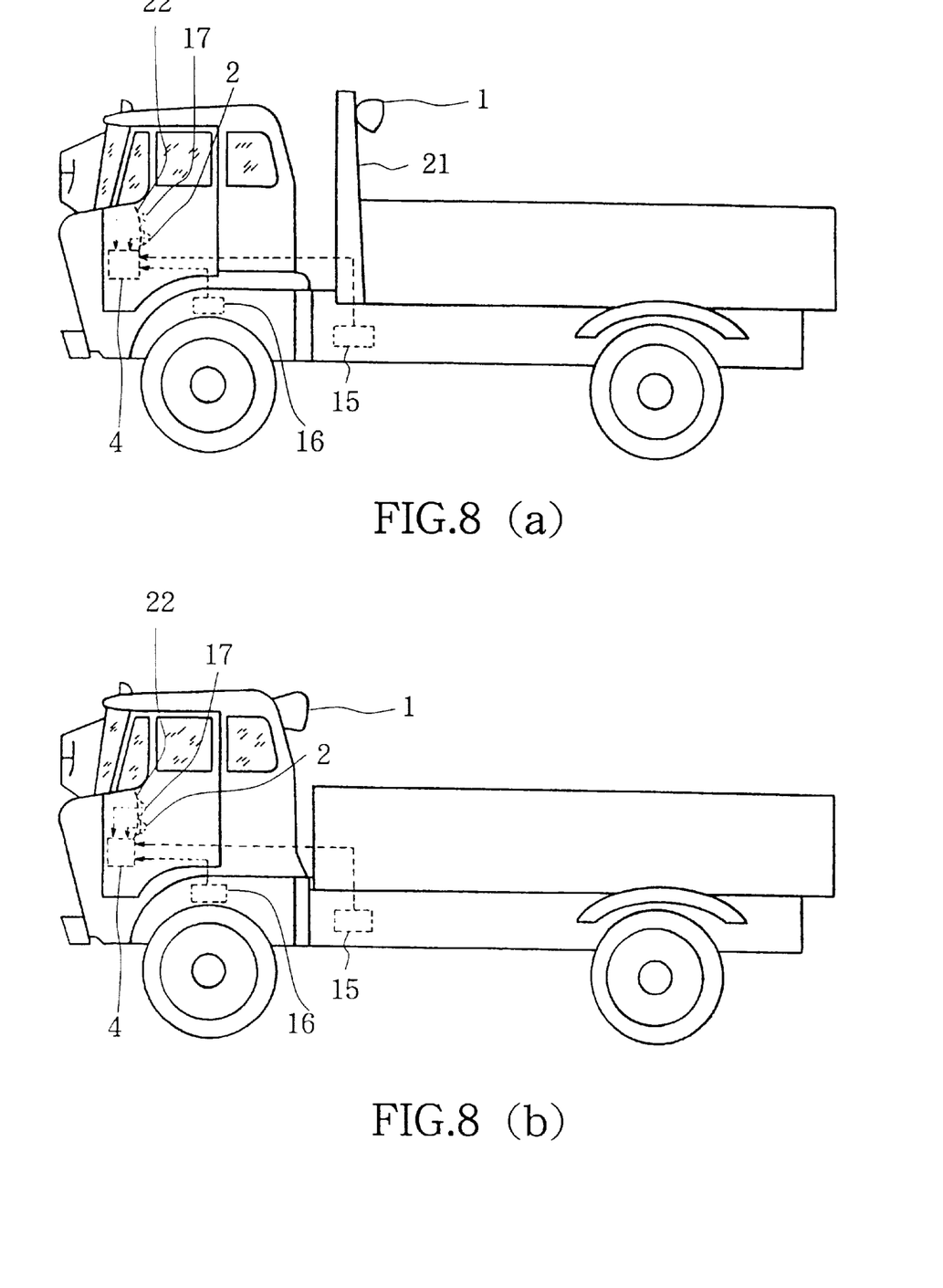
FIG. 8(a) is a side view showing an example of the third embodiment of this invention mounted on a vehicle with a guard frame.
FIG. 8(b) is a side view showing an example of it mounted on a vehicle with no guard frame.

FIG. 8(a) is a side view showing an example of this third embodiment mounted on a vehicle with a guard frame, while FIG. 8(b) is a side view showing an example of it mounted on a vehicle with no guard frame.

Figure 9:
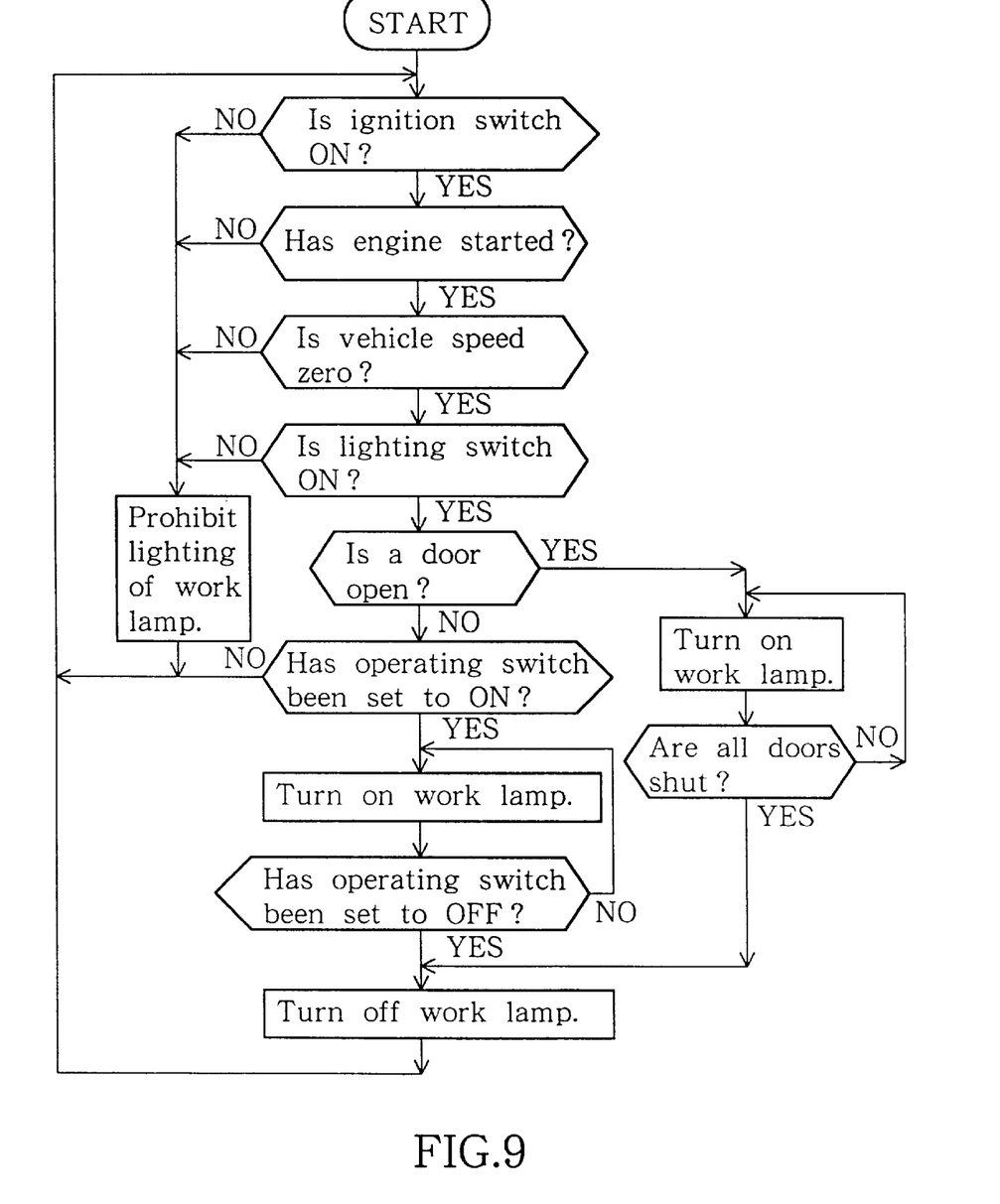
FIG. 9 is a flowchart showing the operating flow of the third embodiment of this invention.

Next, the operation of this third embodiment will be described FIG. 9 is a flowchart showing the operational flow of this third embodiment.

When operating switch 2 has been set to ON, control circuit 4 turns work lamp 1 on if ignition switch 13 has been set to ON, the output of engine rotation sensor 16 shows that the engine has started, the output of vehicle speed sensor 15 shows that vehicle speed is zero, lighting switch 17 is ON, and door switch 14 is OFF (i.e., all doors are shut). If operating switch 2 is then set to OFF, control circuit 4 turns work lamp 1 off.

If the engine has started but the vehicle is stationary and lighting switch 17 is ON, and door switch 14 is ON (i.e., a door has been opened), then on the assumption that work is being carried out at night, work lamp 1 is automatically turned on even if operating switch 2 has not been set to ON. If the output of door switch 14 indicates that the switch is OFF (i.e., that all doors are shut), work lamp 1 is turned off.

If ignition switch 13 is OFF, or the output of engine rotation sensor 16 is zero, or the output of vehicle speed sensor 15 is not zero, or lighting switch 17 is OFF, lighting of work lamp 1 is prohibited.

Additional advantages and modifications will readily occur to those skilled in the art. Therefore, the invention is not limited to the specific details and representative devices shown and described herein. Accordingly, various modifications to the embodiments of the invention may be made without departing from the spirit or scope of the invention as defined by the appended claims.

What is claimed is:

1. A work lamp ON-OFF control circuit for controlling an ON-OFF switching of a work lamp of a vehicle in accordance with a state of an operating switch of the vehicle, said work lamp comprising a lamp for illuminating a rear portion of the vehicle, comprising:

means for receiving signals respectively indicative of the states of said operating switch and an ignition switch and a measurement of vehicle speed; and means which, when an ignition switch of the vehicle is ON and the vehicle speed is not zero, prohibits the lighting of the work lamp, even if the operating switch has been set to ON.

2. A work lamp ON-OFF control circuit according to claim 1, comprising:

means for receiving a signal indicative of a state of whether a door of the vehicle has been opened; and means which, when the ignition switch is ON and the vehicle speed is zero, turns on the work lamp for a period from when the door of the vehicle is opened until it is shut, even if the operating switch is set to OFF.

3. A work lamp ON-OFF control circuit according to claim 1, comprising:

means for receiving a signal indicative of a state of whether a door of the vehicle has been opened; and means which, if the ignition switch is OFF and the door of the vehicle has been opened, causes the work lamp to light, and which causes the work lamp to turn OFF when a fixed time interval has elapsed after the door is shut.

4. A work lamp ON-OFF control circuit according to claim 1, comprising:

means for receiving a signal indicative of a state of whether a door of the vehicle has been opened; and means which, if the ignition switch is OFF, causes the work lamp to light for a period from when the door is opened until it is shut, provided that a fixed period of time has not been exceeded.

5. A work lamp ON-OFF control circuit for controlling an ON-OFF switching of a work lamp of a vehicle in accordance with a state of an operating switch of the vehicle, said work lamp comprising a lamp for illuminating a rear portion of the vehicle, comprising:

means for receiving signals respectively indicative of the state of the operating switch and a lighting switch of a vehicle and measurements of an engine rotation sensor of the vehicle and a speed sensor of the vehicle; and means which, when an engine rotation sensor of the vehicle indicates that an engine of the vehicle is rotating, said speed sensor of the vehicle indicates that the vehicle speed is zero, and the lighting switch of the vehicle is in the OFF state, prohibits the lighting of the work lamp, even if the operating switch is set to ON.

6. A work lamp ON-OFF control circuit according to claim 1, wherein the lamp illuminates white light.

7. A work lamp ON-OFF control circuit according to claim 5, wherein the lamp illuminates white light.

8. A vehicle comprising:

an operating switch;

an ignition switch;

a vehicle speed sensor;

a work lamp having a lamp for illuminating a rear portion of said vehicle; and a work lamp ON-OFF control circuit for controlling an ON-OFF switching of said work lamp in accordance with a state of said operating switch, said control circuit comprising:

means for receiving signals respectively indicative of the state of said operating switch and said ignition switch and the vehicle speed measured by said vehicle speed sensor; and means which, when said ignition switch is ON and the vehicle speed measured by the vehicle speed sensor is not zero, prohibits the lighting of the work lamp, even if said operating switch has been set to ON.

9. A vehicle according to claim 8, wherein said control circuit comprises:

means for receiving a signal indicative of a state of whether a door of the vehicle has been opened;

means which, when the ignition switch is ON and the vehicle speed measured by the vehicle speed sensor is zero, turns on the work lamp for a period from when the door of the vehicle is opened until it is shut, even if the operating switch is set to OFF.

10. A vehicle according to claim 8, wherein the control circuit comprises:

means for receiving a signal indicative of a state of whether a door of the vehicle has been opened; and means which, if the ignition switch is OFF and the door of the vehicle has been opened, causes the work lamp to light, and which causes the work lamp to turn OFF when a fixed time interval has elapsed after the door is shut.

11. A vehicle according to claim 8, wherein said control circuit comprises:

means for receiving a signal indicative of a state of whether a door of the vehicle has been opened; and means which, if the ignition switch is OFF, causes the work lamp to light for a period from when the door is opened until it is shut, provided that a fixed period of time has not been exceeded.

12. A vehicle comprising:

an operating switch;

a lighting switch;

an engine rotation sensor;

a vehicle speed sensor;

a work lamp having a lamp for illuminating a rear portion of the vehicle; and a work lamp ON-OFF control circuit for controlling an ON-OFF switching of the work lamp in accordance with the state of said operating switch, said control circuit comprising:

means for receiving signals respectively indicative of the state of the operating switch and the lightning switch, and measurements of the engine rotation sensor and the vehicle speed sensor; and means which, when said engine rotation sensor indicates that an engine is rotating, said vehicle speed sensor indicates that the vehicle speed is zero, and the lighting switch is in the OFF state, prohibits the lighting of the work lamp, even if the operating switch is ON.

13. A vehicle according to claim 8, wherein the lamp illuminates white light.

14. A vehicle according to claim 12, wherein the lamp illuminates white light.

* * * * *